Aug. 8, 1933.    E. MOORE ET AL    1,921,985
INTERNAL COMBUSTION ENGINE
Filed March 16, 1929    3 Sheets-Sheet 1

INVENTORS
EDWARD MOORE
FRANK ENGEL
BY
A. D. T. Libby
ATTORNEY

Aug. 8, 1933.    E. MOORE ET AL    1,921,985
INTERNAL COMBUSTION ENGINE
Filed March 16, 1929    3 Sheets-Sheet 2
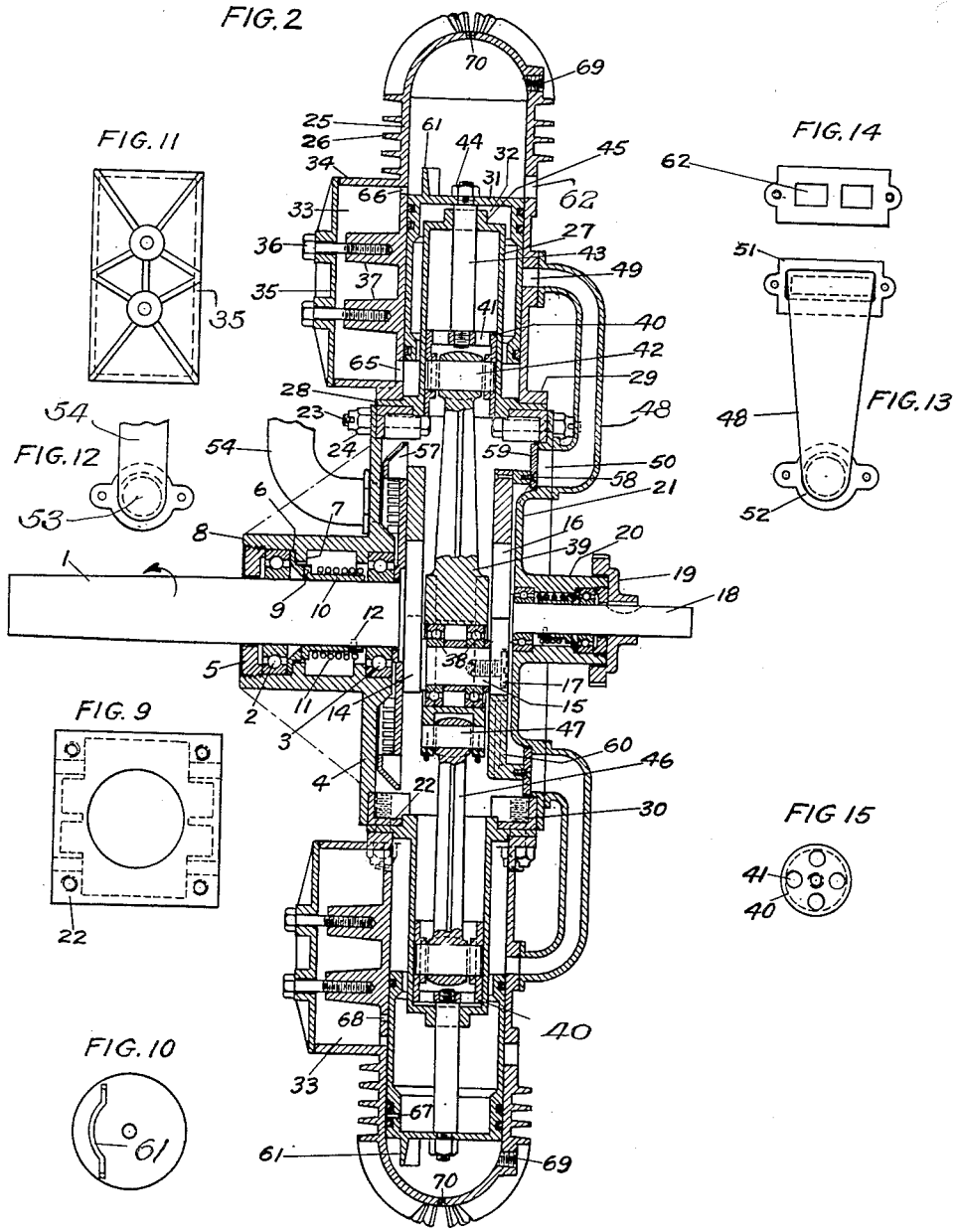
INVENTORS
EDWARD MOORE
FRANK ENGEL
BY
A. D. J. Libby
ATTORNEY Aug. 8, 1933.  E. MOORE ET AL  1,921,985
INTERNAL COMBUSTION ENGINE
Filed March 16, 1929   3 Sheets-Sheet 3
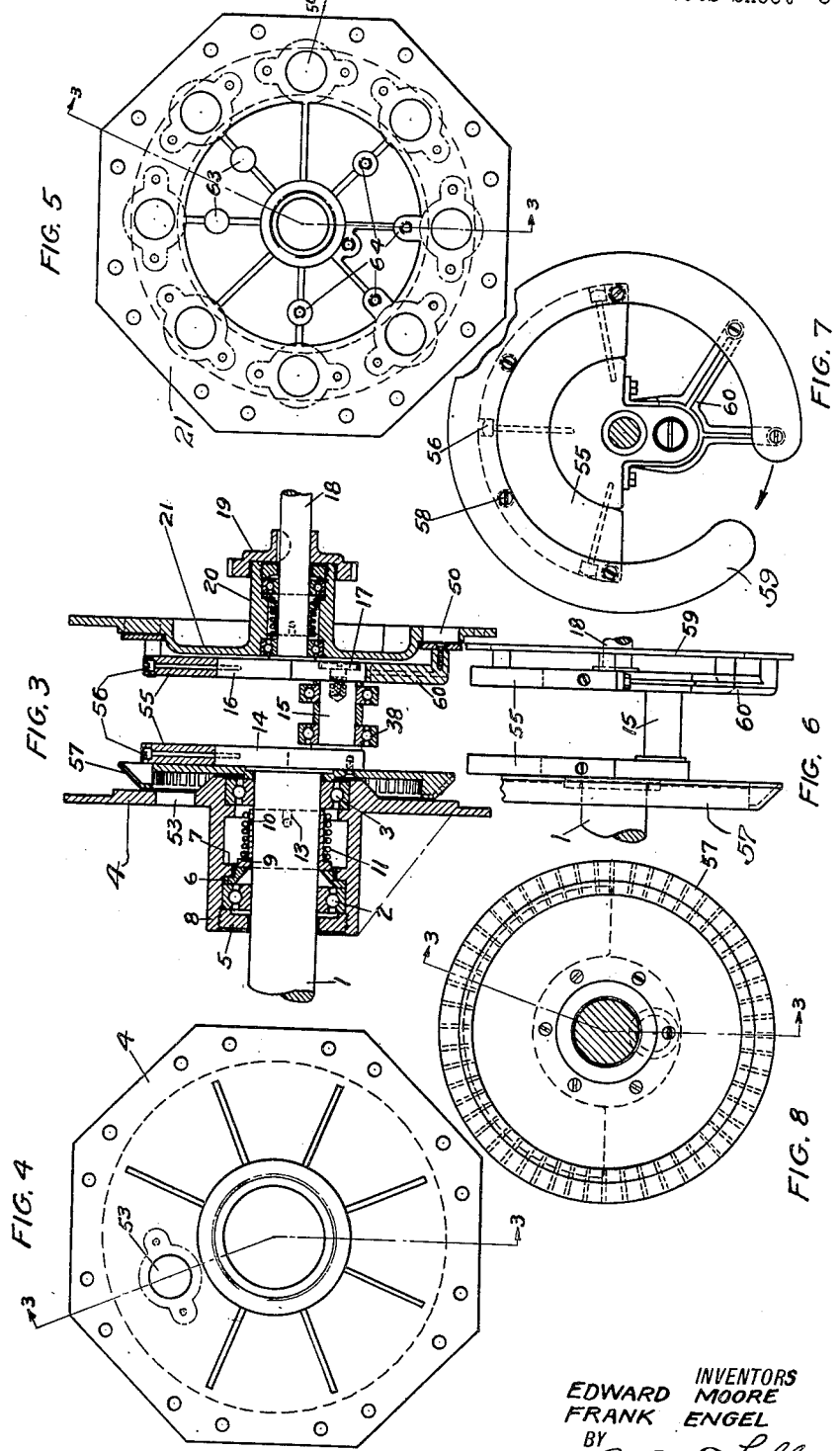
INVENTORS
EDWARD MOORE
FRANK ENGEL
BY
A. D. T. Libby
ATTORNEY Patented Aug. 8, 1933

1,921,985

UNITED STATES PATENT OFFICE 1,921,985

INTERNAL COMBUSTION ENGINE

Edward Moore, Newark, N. J., and Frank Engel, Brooklyn, N. Y., assignors to Albion D. T. Libby, East Orange, N. J.

Application March 16, 1929. Serial No. 347,500

18 Claims. (Cl. 123—55)

This invention relates to an internal combustion engine of the two-cycle type. Due to the present interest and activity in aviation, various designs of engines have been proposed for this class of service. An engine in an airplane is working substantially all of the time under full load conditions and should there be any trouble due to a sticking valve or a broken valve spring, a break in the oil feed line, or trouble in the cam shaft or its drive, serious results may follow and many accidents have been caused by failure of the engine on one or more of the points above mentioned.

It is therefore the principal object of our invention to provide an engine in which there are no valves to stick, no valve springs, oil lines, oil pumps, cams or cam shaft gears and the like to get out of order, and to produce an engine which has a small number of parts, comparatively speaking, thereby giving an engine of great simplicity and one that is cheap to manufacture and will stand a great deal of abuse without getting out of order.

While attaining these various objects, other and ancillary objects will be clear to one skilled in this particular art, after reading the specification taken in connection with the annexed drawings, wherein:

Figure 2 is a vertical sectional view through Figure 1, certain of the parts being shown in full.

Figure 3 is a fragmentary view of the case of the engine with the cylinders and master connecting rod removed.

Figure 4 is a view of the left-hand end plate of Figure 3, which end plate forms a part of the crank case.

Figure 5 is a view of the right-hand plate of Figure 3, which plate forms a part of the crank case.

Figure 6 is a fragmentary plan view of certain of the parts shown in Figure 3.

Figure 7 is an end view of the shutter and counter balance shown on the right-hand part of Figure 6.

Figure 8 is a plan view of the diffuser fan forming the left-hand part of Figure 6.

Figure 9 is a plan view of that part of the crank case on which one of the cylinders is positioned.

Figure 10 is a top view of one of the pistons.

Figure 11 is a front view of the compression chamber cover.

Figure 12 is a fragmentary plan view of the fuel feed pipe at the crank case.

Figure 13 is a plan view of one of the induction pipes extending from the crank case to the cylinder intake port.

Figure 14 is a plan view of the exhaust port.

Figure 15 is a plan view of the top of the piston crosshead.

Figure 1:
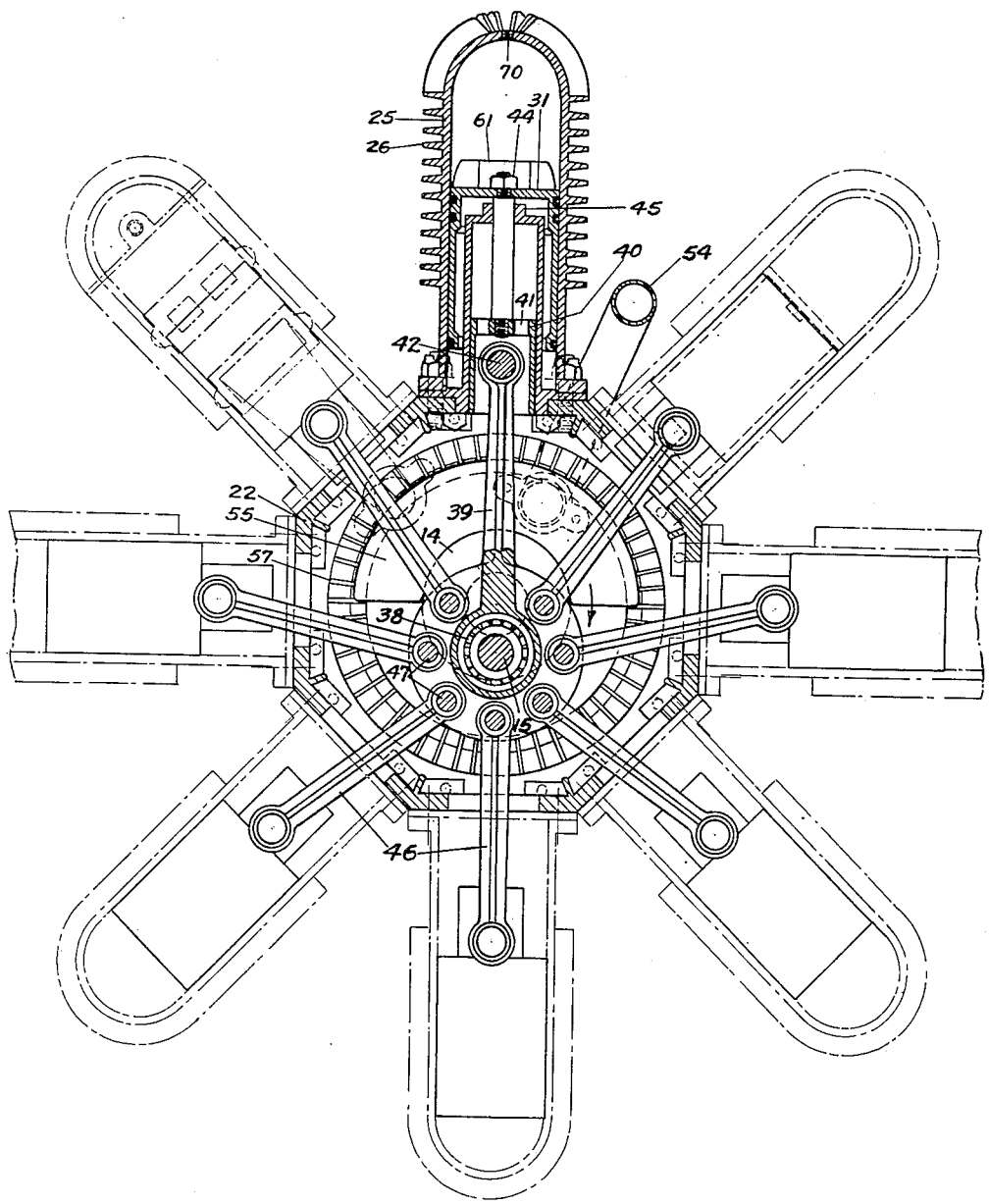
Figure 1 is a part side and vertical sectional view through the engine, certain of the cylinders being shown in broken lines merely to indicate their position.

Referring now to the details wherein like numbers refer to the corresponding parts in the various views, 1 is the propeller end of the crankshaft carried by the bearings 2 and 3 positioned in the end plate 4 forming part of the crank case. The outer race of the bearing 2 is held in position by a flanged nut 5 which presses the race of the bearing against the collar 6 that engages the annular shoulder 7 forming part of the hub 8, thereby forming a seal at this point. Another portion of the collar 6 engages a flange 9 on the sleeve 10, thereby forming a seal at this point.

The sleeve 10 is held against the collar 6 by means of a spring 11 which acts against pins 12 projecting into the shaft 1 and which extend into a slot 13 (see Fig. 3) in the end of the sleeve 10. Since the sleeve 10 rotates with the shaft 1, a rotating contact exists between the flange 9 and the collar 6. This contact is well lubricated by oil coming from the crank case, as will be hereinafter referred to, and the oil helps to form a seal at this point. The combination of the two seals as explained, prevents any leakage of air into the crank case at this end of the shaft.

The shaft 1 has a crank disc 14 carrying the crank pin 15, to which is fastened a crank disc 16 in any suitable manner as by heavy screws 17, one of which is illustrated. Integral with the crank disc 16, is a shaft end 18 carrying a gear 19 used for driving the ignition magnetos. The shaft end 18 is supported on bearings similar to 2 and 3, only smaller, and air seals are provided in the same manner as for the propeller crankshaft end 1, these bearings and parts being carried in the hub 20 forming a part of the crank case plate 21.

Positioned between the end plates 4 and 21, is a plurality of cylinder seats 22, one for each cylinder, fastened to these plates in any satisfactory manner as by bolts 23 and nuts 24. Positioned on each of the seats 22, is a cylinder 25 having air-cooling fins 26, and within each cylinder 25 and spaced from its inner periphery, is a tubular cross-head guide 27 having a flange 28 that is positioned under the flange 29 of the cylinder, and bolted to the crank-case plate 22 by the same studs 30 that hold the cylinder in position. This construction provides a seal for the crank case at the junction of these three members.

Within the cylinder 25, is a piston 31 which is positioned over or telescopes the tubular crosshead guide 27, forming therewith a part 32 of a compression chamber, the other part 33 of which is formed by a projection 34 on one side of the cylinder. This part 33 of the compression chamber is closed by a suitable cover 35 held by the studs 36 engaging threaded holes in bosses 37. It is to be understood that a suitable gasket is used in connection with the cover 35.

Mounted on the crank pin 15 by a pair of suitable bearings 38, is a master connecting rod 39 which is shown in connection with the top cylinder in Figures 1 and 2. The upper end of the connecting rod 39 is provided with a crosshead 40 which has a plurality of holes 41 (see Fig. 15) therein for the purpose of passing the lubricant to the connecting pin 42, as will be later referred to. Attached to the cross-head 40 is a piston rod 43 which passes through the end of the tubular cross-head guide 27 and is fastened to the top of the piston 31 in any satisfactory manner as by a nut 44. Preferably, the end of the tubular cross-head guide 27 is enlarged as at 45 to provide a bearing for the piston rod 43.

Positioned between the crank discs 14 and 16, there is a secondary connecting rod 46 for each of the other pistons. These secondary rods 46 are connected to the crank discs 14 and 16 by pins 47, while the rest of the construction for each of the cylinders is the same as has been described for the master cylinder.

Associated with each of the cylinders, is an induction pipe 48 having one end positioned over the intake port 49 and the other end fitting over an opening 50 in the crank case plate 21. The induction pipe 48 is fitted with a flange 51 at the intake port end, and with a flange 52 at the crank case end (see Figure 13). On the opposite side of the engine, the crank case plate 4 is provided with an opening 53 to receive a carbureter feed pipe 54, it being understood that in our arrangement, only one carbureter need be used, while in the ordinary eight-cylinder airplane engine, at least two carbureters are always used.

The crank disc 14 is provided with a counterbalance weight 55, the same being fastened thereto in any satisfactory manner as by screws 56. Attached to the crank disc 14 and counterbalance weight 55 and the crankshaft 1, is a fan 57 which is placed adjacent the carburetor opening 53, the purpose of which will be later referred to. On the crank disc 16, is carried another counter weight like 55, and fastened to this counter weight as by screws 58, is a shutter plate 59. The forward end of the shutter plate where it extends beyond the counter weight 55, is supported by a bracket 60 which is fastened to a cut-away portion in the crank disc 16, as shown in Figure 7, from which figure it will be understood that the shutter 59 is adapted to close all of the induction openings 50 leading from the crank case, with the exception of one, and that is the one under an induction stroke. The further purpose of the shutter 59 will be set forth in the description of the operation of the engine.

Each piston head 31 is provided with a deflector 61 to deflect the incoming charge toward the top of the cylinder away from the exhaust port 62, as is usual in the two-cycle engine. By reference to Figure 5, it will be observed that the crank case plate 21 is provided with bosses 63 for the purpose of mounting the carburetor, and with bosses 64 for attaching the magneto bracket which preferably carries two magnetos so as to give double ignition to each of the engine cylinders.

Coming now to the operation of our engine, only a single carburetor is required and this feeds a mixture of air, gas and oil into the crank case which is sealed at the various points as has been described. As this mixture enters the opening 53 into the crank case, it is caught by the centrifugal fan 57 which extracts from the mixture a considerable quantity of the oil, which is thrown over all of the operating parts within the crank case, and a certain amount of this oil works out to the crank shaft bearings, as has been referred to. Thus it will be understood that the entire lubrication of the engine is provided by the oil fed to the engine through the gas mixture, and for a type of engine as herein shown and described, we have found that one pint of oil to five gallons of gas gives satisfactory results, and this is a great saving in oil over the ordinary whirlwind or radial type of airplane engine.

As shown in Figure 1 and 2, the master piston on the master cylinder is shown in the position of its full down stroke, but on the up stroke, suction is set up within that part of the chamber 32 between the piston 31 and the cross-head guide 27, and as the bottom or skirt of the piston uncovers the port 49, a quick suction is produced through the induction pipe 48 on the mixture in the crank case, it being understood that at this time the shutter 59 has uncovered the port 50 associated with the induction pipe within which this suction is set up. By this action, a combustible charge is drawn from the crank case into the space 32, and since the port 65 at the bottom of the compression space 33 is uncovered, the spaces 32 and 33 are filled with the incoming charge, it being understood that the port 66 is closed at this time, and likewise the exhaust port 62.

On the downward stroke of the piston 31, the charge in the compression chambers 32—33 is compressed a given amount which we have found by experiment to be between seven and eight pounds for best results, and when the port 66 is uncovered as shown in Figure 2, this charge under compression is ejected through the port 66 into the cylinder 25, and by reason of the deflector 61, it is turned toward the upper part of the cylinder away from the exhaust port 62 which is now open. This manner of feeding the mixture to the cylinders is a very important part of our invention.

Since the shutter 59 operates closely adjacent the induction opening 50, all of these openings to the other cylinders, except the one under the induction stroke, are shut off and all interference which might come from other cylinders where a number are used, as shown, is prevented and complete control of each cylinder is thus obtained.

Where a radial engine is used, as shown in Figure 1, the bottom cylinders may collect a li quantity of the combustion mixture, whether oil or unvaporized gas or both, and they would then have a tendency to load up or fire irregularly. To overcome this, we have provided the top of the side wall of these pistons with a small opening 67, which is brought into alignment with an opening 68 entering into the compression chamber space 33 at the time when the piston is on its down stroke. This will eject this surplus oil or fuel into the compression chamber and it is then passed upward into the cylinder and fired. While we have found it only necessary to use this arrangement on the bottom cylinders, it of course may be used on all of the cylinders.

The holes 41 in the cross-head are used to pass the oil which comes up the connecting rods for the purpose of oiling the cross-head and cross-head pin. Each cylinder is provided with a tapped-hole 69 to receive a spark plug, and if necessary with a tapped-hole 70 to receive a priming cock or a second spark plug.

From what has been said, it will be observed that in the engine shown and described herein, the cylinders fire in successive order at every forty-five degrees, thereby giving a uniform and continuous torque effort on the crankshaft.

Owing to the extreme popularity at this time of a radial type of engine, we have chosen to illustrate our invention in connection with an engine of this character, but it is to be understood that this design may also be incorporated in cylinders set in line or in two lines and used in other places where airplanes or internal combustion engines are required, and it is quite apparent that various changes may be made in the details for carrying our invention into practice, without departing from the spirit of the same or the scope of the appended claims.

Having thus described my invention, what I claim is:

1. An internal combustion engine including; a crank-case, a single throw crankshaft carried by said case, a plurality of cylinders arcuately spaced at equal angles on the case, a master connecting rod fastened to the crankshaft, a secondary connecting rod for each cylinder other than the one associated with said master rod, said secondary rods being connected to function in cooperation with the master rod, a fixed tubular cross-head guide for each cylinder, a cross head attached to the upper end of each connecting rod, a piston adapted to slide back and forth over said tubular crosshead guide, thereby setting up a pressure within the space between said piston and guide, a piston rod connected between the head of the piston and said crosshead and passing through the end of said crosshead guide, means for passing charges of air, gas, and oil into the crank-case, individual induction pipes leading from the intake port of each cylinder to the crank-case for passing combustion charges to said compression spaces according to the movement of said pistons, a single means within the crankcase operated by the crankshaft for shutting off all of said induction pipes according to the firing order of the cylinders, except that pipe serving a cylinder under suction, and a by-pass chamber on each cylinder for passing the charges from said compression spaces into said cylinders as required.

2. An internal combustion engine incuding; a crank-case, a single throw crankshaft carried by said case, a plurality of cylinders arcuately spaced at equal angles on the case, a master connecting rod fastened to the crankshaft, a secondary connecting rod for each cylinder other than the one associated with said master rod, said secondary rods being connected to function in cooperation with the master rod, a fixed tubular crosshead guide for each cylinder, a crosshead attached to the upper end of each connecting rod, a piston adapted to slide back and forth over said tubular crosshead guide, thereby setting up a pressure within the space between said piston and guide, a piston rod connected between the head of the piston and said crosshead and passing through the end of said crosshead guide, means for passing charges of air, gas, and oil into the crank-case, individual induction pipes leading from the intake port of each cylinder to the crank-case for passing combustion charges to said compression spaces according to the movement of said pistons, a single means within the crank-case operated by the crankshaft for shutting off all of said induction pipes according to the firing order of the cylinders, except that pipe serving a cylinder under suction, also means within the crank-case, independent of the various connecting rods, operated by the crankshaft for continually agitating said combustion charges, and a by-pass chamber on each cylinder for passing the charges from said compression spaces into said cylinders as required.

3. A radial type of internal combustion engine including; eight cylinders disposed at angles of 45°, a crank-case carrying said cylinders, a crankshaft supported by the case, said crankshaft having a single crank pin and crank disc, a master connecting rod for one cylinder connected directly to the crank pin through a suitable bearing, a secondary connecting rod for each of the other cylinders connected to said crank disc, a fixed tubular crosshead guide positioned within each cylinder, a crosshead for each connecting rod, a tubular piston for each cylinder adapted to telescope its said guide but spaced therefrom to form a compression chamber therewith, a piston rod connected between each crosshead and the head of its associated piston and passing through the end of its crosshead guide, means for passing a mixture of air, gas, and oil into the crank-case, individual induction pipes leading from the intake port of each cylinder to the crank-case for passing a certain amount of said mixture into successive compression chambers for compression therein as its piston telescopes its crosshead guide, a fan positioned within the crank-case closely adjacent the place of entrance of the combustible mixture and operated by the crankshaft, a single means within the crank-case operated by the crankshaft for shutting off all of said induction pipes successively, except the one serving a cylinder under the suction part of the piston stroke, and means for passing the compressed mixture into the cylinder associated with the said piston.

4. A radial type of internal combustion engine including; eight cylinders disposed at angles of 45°, a crank-case carrying said cylinders, a crankshaft supported by the case, said crankshaft having a single crank pin and crank disc, a master connecting rod for one cylinder connected directly to the crank pin through a suitable bearing, a secondary connecting rod for each of the other cylinders connected to said crank disc, a fixed tubular crosshead guide positioned within each cylinder, a crosshead for each connecting rod, a tubular piston for each cylinder adapted to telescope its said guide but spaced therefrom to form a compression chamber therewith, a piston rod connected between each crosshead and the head of its associated piston and passing through the end of its crosshead guide, means for passing a mixture of air, gas, and oil into the crank-case, individual induction pipes leading from the intake port of each cylinder to the crank-case for passing a certain amount of said mixture into successive compression chambers for compression therein as its piston telescopes its crosshead guide, means within the crank-case independent of the various connecting rods, for separating a large percentage of the oil from said mixture and throwing this oil over the moving parts within the crank-case, a single means operated by the crankshaft for preventing any deleterious effects from any cylinder coming back into the crank case via its induction pipe, and means for passing the compressed mixture into the cylinder associated with the said piston.

5. A radial type of internal combustion engine including; eight cylinders disposed at angles of 45°, a crank-case carrying said cylinders, a crankshaft supported by the case, said crankshaft having a single crank pin and crank disc, a master connecting rod for one cylinder connected directly to the crank pin through a suitable bearing, a secondary connecting rod for each of the other cylinders connected to said crank disc, a fixed tubular crosshead guide positioned within each cylinder, a crosshead for each connecting rod, a tubular piston for each cylinder adapted to telescope its said guide but spaced therefrom to form a compression chamber therewith, a piston rod connected between each crosshead and the head of its associated piston and passing through the end of its crosshead guide, means for passing a mixture of air, gas, and oil into the crank-case, individual induction pipes leading from the intake port of each cylinder to the crank-case for passing a certain amount of said mixture into successive compression chambers for compression therein as its piston telescopes its crosshead guide, a fan operated by said crankshaft for keeping said mixture agitated and throwing the greater part of oil out for lubrication purposes within the crank-case, a shutter within the crank-case operated by the crankshaft for shutting off all of the induction pipes except the one serving a cylinder under the suction part of its piston stroke for the purposes described, and means for passing the compressed mixture into the cylinder associated with the said piston.

6. A two-cycle radial eight-cylinder internal combustion engine having its cylinders set 45° apart and having a successive firing order of its cylinders, said engine having a crank-case carrying the cylinders, a fixed tubular crosshead guide for each cylinder also supported on said case within the cylinders and forming at least a part of a compression chamber, a single throw crankshaft, a piston for each cylinder also forming a moving part of said compression chamber, a connecting rod for each piston operatively connected to the crankshaft, a piston rod for each connecting rod and connecting it to its respective piston, means for passing a mixture of air, gas, and oil into the crank-case, means within the crank-case, independent of the various connecting rods, for removing a large part of the oil from the mixture and distributing it over the moving parts within the crank-case, an induction pipe leading from the crank-case to each cylinder intake, a single means within the crank-case for shutting off all of said induction pipes successively, except the one serving a cylinder under the suction part of its piston stroke whereby a charge is drawn into said compression chamber and then compressed therein by the downward movement of the piston, and means for transferring the compressed charge to the cylinder near the end of the down stroke of the piston.

7. A two-cycle radial eight-cylinder internal combustion engine having its cylinders set 45° apart and having a successive firing order of its cylinders, said engine having a crank-case carrying the cylinders, a fixed tubular crosshead guide for each cylinder also supported on said case within the cylinders and forming at least a part of a compression chamber, a single throw crankshaft, a piston for each cylinder also forming a moving part of said compression chamber, a connecting rod for each piston operatively connected to the crankshaft, a piston rod for each connecting rod and connecting it to its respective piston, means for passing a mixture of air, gas, and oil into the crank-case, a fan within the crank case for removing a large part of the oil from the mixture and keeping the mixture well agitated, an induction pipe from the crank-case to each cylinder intake, a shutter for preventing any interference between the various induction pipes and allowing only the right one to have free access to the crank-case at the time of the suction stroke of the piston in the cylinder associated with said pipe, and means for transferring the mixture, under pressure set up by the piston on its down stroke, into the cylinder.

8. A two-cycle radial eight-cylinder internal combustion engine having its cylinders set 45° apart and having a successive firing order of its cylinders, said engine having a crank-case carrying the cylinders, a fixed tubular crosshead guide for each cylinder also supported on said case within the cylinders and forming at least a part of a compression chamber, a single throw crankshaft, a piston for each cylinder also forming a moving part of said compression chamber, a connecting rod for each piston operatively connected to the crankshaft, a piston rod for each connecting rod and connecting it to its respective pistons, means for passing a mixture of air, gas, and oil into the crank-case, means within the crank-case, independent of the various connecting rods, for removing a large part of the oil from the mixture and distributing it over the moving part within the crank-case, an induction pipe leading from the crank-case to each cylinder intake, a single means within the crank-case for shutting off all of said induction pipes successively, except the one serving a cylinder under the suction part of its piston stroke whereby a charge is drawn into said compression chamber and then compressed therein by the downward movement of the piston, means for transferring the compressed charge to the cylinder near the end of the down stroke of the piston, and means located in part in the wall of at least one of the pistons and in part in the wall of its cylinder for preventing an accumulation of oil in the feed compression chamber formed in part inside the piston.

9. A two-cycle radial eight-cylinder internal combustion engine having its cylinders set 45° apart and having a successive firing order of its cylinders, said engine having a crank-case carrying the cylinders, a fixed tubular crosshead guide for each cylinder also supported on said case within the cylinders and forming at least a part of a compression chamber, a single throw crankshaft, a piston for each cylinder also forming a moving part of said compression chamber, a connecting rod for each piston operatively connected to the crankshaft, a piston rod for each connecting rod and connecting it to its respective pistons, means for passing a mixture of air, gas, and oil into the crank-case, a fan within the crank case for removing a large part of the oil from the mixture and keeping the mixture well agitated, an induction pipe from the crank-case to each cylinder intake, a shutter for preventing any interference between the various induction pipes and allowing only the right one to have free access to the crank-case at the time of the suction stroke of the piston in the cylinder associated with said pipe, a transfer chamber on the side of each cylinder also forming an extension of the compression chamber formed by a piston and its tubular guide, at least the piston in the bottom cylinders having small holes in their side walls near the end of the piston and said cylinder walls having cooperating holes through their walls into their respective transfer chambers as and for the purposes described.

10. A two-cycle radial multi-cylinder internal combustion engine having its cylinders equally spaced apart and having a successive firing order of its cylinders, said engine having a crank-case supporting the cylinders, each cylinder having; an individual induction pipe between its intake port and an opening in the crank-case and a mixture transfer chamber, said chamber also acting as part of a compression chamber, a fixed tubular crosshead guide within the cylinder, a piston telescoping said tubular guide forming with it the remainder of said compression chamber; a single throw crankshaft, a connecting rod for each cylinder, a piston rod between each piston and its connecting rod passing through the end of its tubular guide, means for passing a mixture of air, gas and oil into the crank-case, and a single means within the case for insuring that only the one proper induction pipe is opened to the crank-case at the time it is desired to charge said compression chamber, said charge being compressed in said chamber on the down stroke of the piston and then transferred by said transfer chamber into the cylinder just before the beginning of the upstroke of the piston.

11. A two-cycle radial multi-cylinder internal combustion engine having its cylinders equally spaced apart and having a successive firing order of its cylinders, said engine having a crank-case supporting the cylinders, each cylinder having; an individual induction pipe between its intake port and an opening in the crank-case and a mixture transfer chamber, said chamber also acting as part of a compression chamber, a fixed tubular crosshead guide within the cylinder, a piston telescoping said tubular guide forming with it the remainder of said compression chamber; a single throw crankshaft, a connecting rod for each cylinder, a piston rod between each piston and its connecting rod passing through the end of its tubular guide, means for passing a mixture of air, gas, and oil into the crank-case, means within the case, independent of the various connecting rods, for extracting a part of the oil from said mixture for lubricating the parts within the case, and a single means within the case for successively uncovering an induction pipe which is ready to pass a charge to its compression chamber, said charge being then compressed on the down stroke of the piston and at substantially the end of the down stroke, transferred to the cylinder by said transfer chamber.

12. A two-cycle radial multi-cylinder internal combustion engine having its cylinders equally spaced apart and having a successive firing order of its cylinders, said engine having a crank-case supporting the cylinders, each cylinder having; an individual induction pipe between its intake port and an opening in the crank-case and a mixture transfer chamber, said chamber also acting as part of a compression chamber, a fixed tubular crosshead guide within the cylinder, a piston telescoping said tubular guide forming with it the remainder of said compression chamber; a single throw crankshaft, a connecting rod for each cylinder, a piston rod between each piston and its connecting rod passing through the end of its tubular guide, a single means for passing a mixture of air, gas and oil into the crank-case, a fan within the case for extracting a part of the oil from the mixture for lubricating the parts within the case and a shutter rotating with the crankshaft for successively uncovering said induction pipes as charges are required in successive compression chambers and cylinders.

13. A two-cycle radial multi-cylinder internal combustion engine having its cylinders equally spaced apart and having a successive firing order of its cylinders, said engine having a crank-case supporting the cylinders, each cylinder having; an individual induction pipe between its intake port and an opening in the crank-case and a mixture transfer chamber, said chamber also acting as part of a compression chamber, a fixed tubular crosshead guide within the cylinder, a piston telescoping said tubular guide forming with it the remainder of said compression chamber; a single throw crankshaft, a connecting rod for each cylinder, a piston rod between each piston and its connecting rod passing through the end of its tubular guide, means for passing a mixture of air, gas, and oil into the crank-case, means within the case, independent of the various connecting rods, for extracting a part of the oil from said mixture for lubricating the parts within the case, means within the case for successively uncovering an induction pipe which is ready to pass a charge to its compression chamber, said charge being then compressed on the down stroke of the piston and at substantially the end of the down stroke, transferred to the cylinder by said transfer chamber, and means for preventing an undue accumulation of any part of the mixture in at least the lower cylinders and compression chambers of the engine.

14. A two-cycle internal combustion engine including; a crank-case, a cylinder attached to the case and having intake and exhaust ports, a fixed tubular crosshead guide having a flange extending between a part of the cylinder and case to form a seal at this point, the same means being used to fasten both to the case, a transfer chamber on the side of the cylinder forming also a part of a force feed compression chamber, a piston telescoping the tubular guide and forming with it the remainder of the compression chamber, a single throw crankshaft, a connecting rod attached to the crankshaft, a piston rod reaching between the connecting rod and the piston, passing through the head of said tubular guide, means for passing a mixture of air, gas, and oil into the crank case, and means including an induction pipe connecting the interior of the crank-case with the cylinder intake port for allowing the piston on its up-stroke to draw a mixture charge from the crank-case into the compression chamber where it is compressed by the piston on its down stroke, said compressed charge being then transferred, by said transfer chamber, to the cylinder just previous to the beginning of the up-stroke of the piston, said engine being lubricated by the oil in the mixture, and means for preventing an undue accumulation of any part of the mixture in that part of the compression chamber formed between the tubular guide and the piston.

15. A two-cycle internal combustion engine including; a crank-case, a plurality of cylinders attached to the case and having intake and exhaust ports, each cylinder including; a fixed tubular cross-head guide fastened to the case, a transfer chamber on the side of the cylinder and also forming part of a compression chamber, a piston adapted to move over the tubular guide and forming with it the remainder of the compression chamber, a connecting rod, a piston rod joining the piston to the connecting rod and an induction pipe connecting the interior of said case to the cylinder intake port; a crankshaft to which said connecting rods are operatively connected, means for passing a mixture of air, gas, and oil into the crank-case, combustion charges being taken from said mixture in the crank-case through said induction pipes into said compression chambers according to the firing order of the engine on the up-stroke of each piston, compressed in said chamber on the down-stroke of the piston and then transferred by said transfer chamber to the cylinder just previous to the beginning of the up-stroke of the piston therein, and a centrifugal blower within the crank-case operated by the crankshaft for separating sufficient oil from the mixture for lubricating the parts within the crank-case needing lubrication.

16. A unit construction for a two-cycle internal combustion engine including; a cylinder having a supporting base and also having intake and exhaust ports and a chamber on one side of the cylinder forming a transfer in the wall of the cylinder to be opened and closed by the cylinder piston chamber and a part of a compression chamber for said cylinder, a fixed tubular crosshead guide adapted to be fastened to a support member along with the cylinder, a piston adapted to move over said tubular guide and forming with it the remainder of the compression chamber, a connecting rod adapted to be connected to a crankshaft, and a piston rod passing through the crosshead guide and joining the piston to the connecting rod, a fuel feed connection to said base, means within the base for uncovering an induction pipe leading to said intake port, said intake port serving to pass combustible charges to said compression chamber on the up-stroke of the piston, said transfer chamber acting to transfer to the cylinder, the charge compressed in said compression chamber on the work stroke of the piston, substantially at the end of the compression stroke.

17. In a two-cycle multi-cylinder engine receiving its cylinder charges through the crank-case by means of separate induction pipes leading from the crank-case to each cylinder intake, a single means within the crank-case for preventing any interference between the various induction pipes, and allowing only the right one to have free access to the crank-case at the time of the suction stroke of the piston in the cylinder associated with said pipe, and a fan within the crank-case for removing some of the oil from and keeping the mixture well agitated.

18. In a two-cycle multi-cylinder engine receiving its cylinder charges through the crank-case by means of separate induction pipes leading from the crank-case to each cylinder intake, a single means within the crank-case for preventing any interference between the various induction pipes, and allowing only the right one to have free access to the crank-case at the time of the suction stroke of the piston in the cylinder associated with said pipe.

EDWARD MOORE.
FRANK ENGEL.